(12) United States Patent
Hsu et al.

(10) Patent No.: US 8,326,568 B2
(45) Date of Patent: Dec. 4, 2012

(54) TEMPERATURE SENSOR AND TEMPERATURE SENSING METHOD

(75) Inventors: Chen-Ming Hsu, Sinshih Township, Tainan County (TW); Yaw-Guang Chang, Sinshih Township, Tainan County (TW)

(73) Assignee: Himax Technologies Limited, Sinshih Township, Tainan County (TW)

( * ) Notice: Subject to any disclaimer, the term of this patent is extended or adjusted under 35 U.S.C. 154(b) by 293 days.

(21) Appl. No.: 12/829,974

(22) Filed: Jul. 2, 2010

(65) Prior Publication Data

US 2012/0004880 A1 Jan. 5, 2012

(51) Int. Cl.
*G01K 15/00* (2006.01)
*G01K 1/00* (2006.01)
*G01K 17/00* (2006.01)
*G01D 18/00* (2006.01)

(52) U.S. Cl. ........... 702/130; 702/99; 702/104; 702/117

(58) Field of Classification Search ............. 702/99, 702/104, 117, 130
See application file for complete search history.

(56) References Cited

U.S. PATENT DOCUMENTS

| 5,347,476 A * | 9/1994 | McBean, Sr. ............ 702/91 |
| 7,029,171 B2 * | 4/2006 | Tesi et al. ............ 374/1 |
| 2005/0017889 A1 * | 1/2005 | Stockstad ............ 341/164 |
| 2005/0190804 A1 * | 9/2005 | Robinson et al. ...... 372/29.015 |

* cited by examiner

*Primary Examiner* — Janet Suglo
(74) *Attorney, Agent, or Firm* — McClure, Qualey & Rodack, LLP

(57) ABSTRACT

A temperature sensor is provided. The temperature sensor includes: a temperature sensing unit for sensing a temperature and outputting a temperature sensing signal; an analog-to-digital converter (ADC), coupled to the temperature sensing unit, for converting the temperature sensing signal to a digital value, having an ADC output range; a calibration unit, coupled to the ADC, for correlating the ADC output range with at least one temperature range; a memory unit, coupled to the calibration unit, recording the ADC output range, and the at least one temperature range, and the correlation therebetween.

12 Claims, 7 Drawing Sheets

TEMPERATURE SENSOR AND TEMPERATURE SENSING METHOD

BACKGROUND OF THE INVENTION

1. Field of the Invention

The present invention relates to temperature sensors and temperature sensing methods, and in particular relates to temperature sensors and temperature sensing methods having variable sensitivity for various temperature ranges.

2. Description of the Related Art

An electronic temperature sensor, usually integrated with electronic components in a semiconductor chip, is a device for measuring the temperature of electronic components or the surrounding environment of electronic components.

In an application, a temperature sensor integrated with a CPU can provide temperature information for the CPU. With the temperature information, the CPU can determine whether to reduce operation speed or enter a sleeping mode to protect itself from overheating. In another application, a panel driving chip has to adjust its temperature-dependent gate voltage to achieve a better display performance. Therefore, a temperature sensor which can provide surrounding environment temperature data is required.

However, the temperature sensor of prior art requires complicated calibration circuitry to maintain its linearity. In addition, the temperature sensor of prior art is merely applicable for a particular temperature range and has a fixed sensitivity.

Therefore, it is desirable to provide a new temperature sensor which is applicable for various temperature ranges and has variable sensitivity for different temperature ranges.

BRIEF SUMMARY OF THE INVENTION

The present invention provides a temperature sensor, comprising: a temperature sensing unit for sensing a temperature and outputting a temperature sensing signal; an analog-to-digital converter (ADC), coupled to the temperature sensing unit, for converting the temperature sensing signal to a digital value, having an ADC output range; a calibration unit, coupled to the ADC, for correlating the ADC output range with at least one temperature range; a memory unit, coupled to the calibration unit, recording the ADC output range, and the at least one temperature range, and the correlation therebetween.

The present invention also provides a temperature sensing method, comprising: sensing a temperature and outputting a temperature sensing signal; converting the temperature sensing signal to a digital value by an analog-to-digital converter (ADC), wherein the ADC has an ADC output range; correlating the ADC output range with at least one temperature range; and recording the ADC output range, and the at least one temperature range by a memory unit, and the correlation therebetween.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
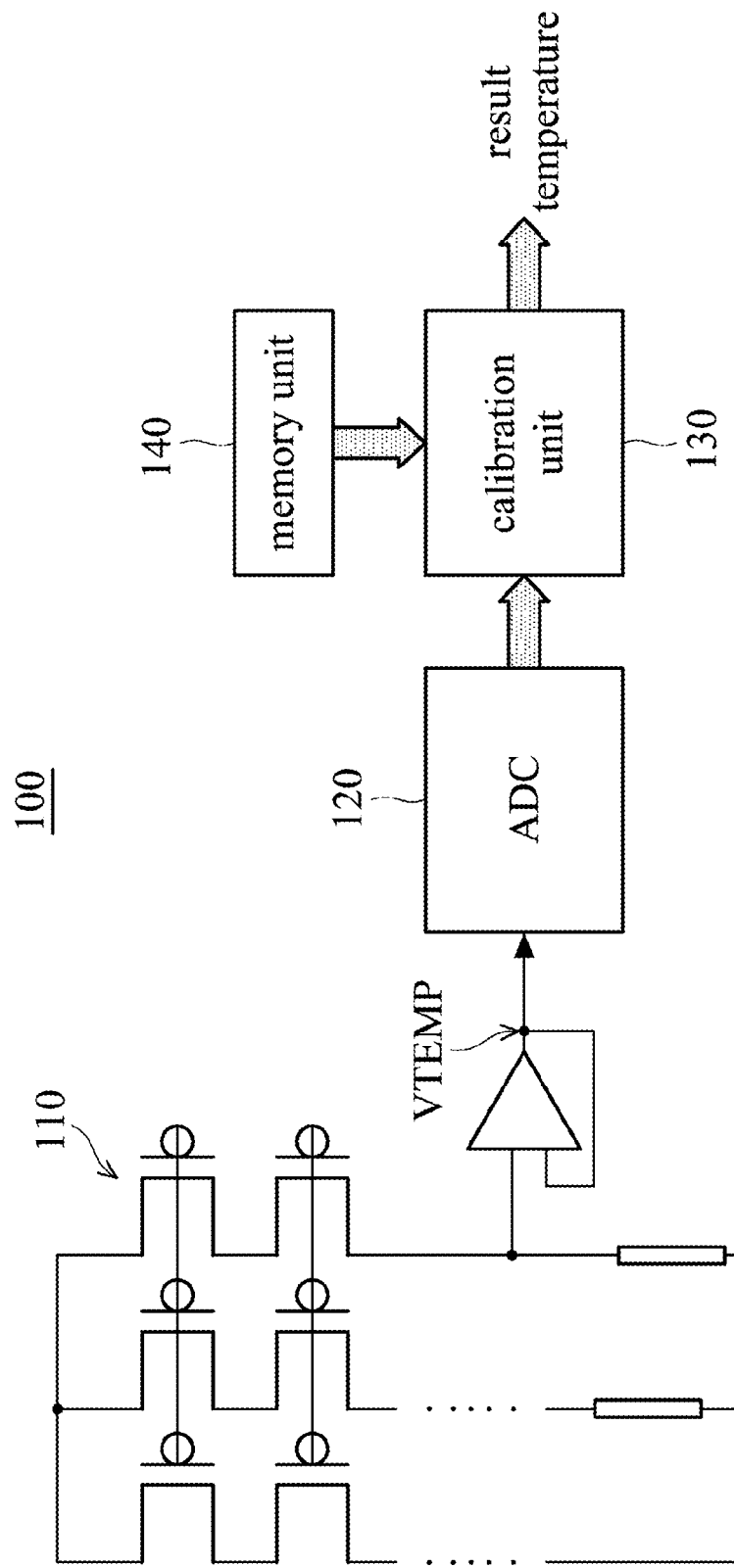
FIG. 1 shows a schematic diagram of a temperature sensor according to one embodiment of the present invention.

FIG. 1 shows a schematic diagram of a temperature sensor according to one embodiment of the present invention. In an embodiment, the temperature sensor 100 is integrated with an electronic component, e.g., a center processing unit (CPU), in a semiconductor chip for measuring the temperature therein, but it will be appreciated that the present invention is not intended to be limited thereto. The temperature sensor 100 comprises a temperature sensing unit 110, an analog-to-digital converter (ADC) 120, a calibration unit 130 and a memory unit 140.

Figure 2A:
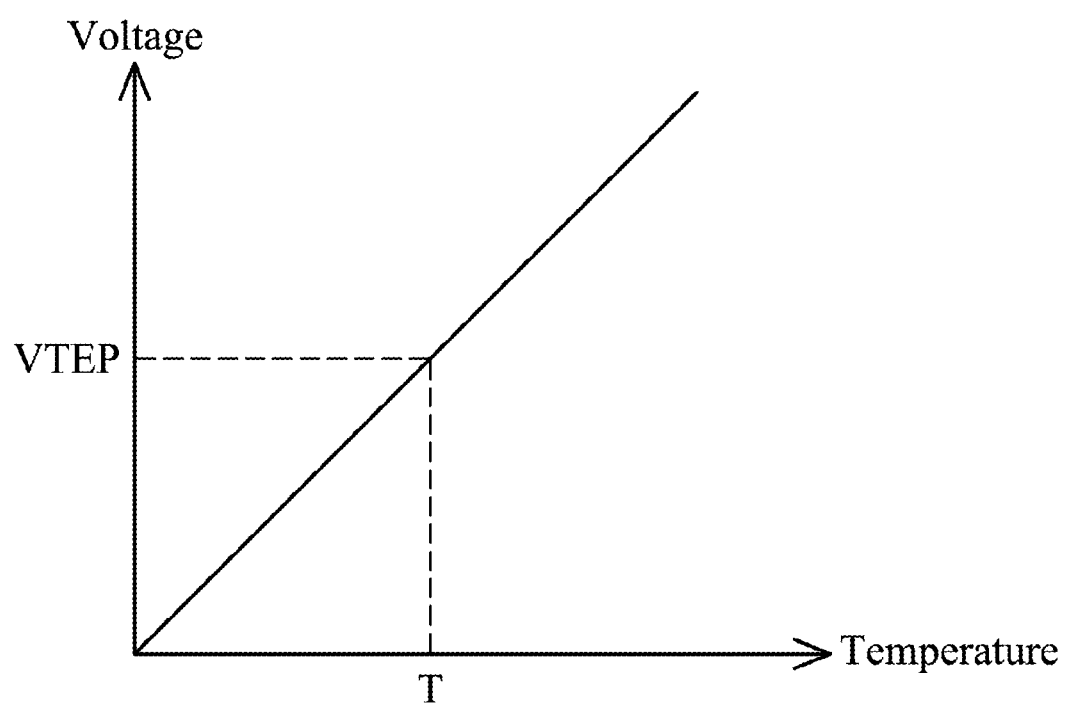
FIG. 2A is a diagram illustrating the relationship between the voltage and temperature of the temperature sensing unit 110.

The temperature sensing unit 110 of the present invention is used to sense a temperature and output a temperature sensing signal. The value of the temperature sensing signal, in this embodiment, should correspond to the temperature in the semiconductor chip. In a preferred embodiment, the temperature sensing unit 110 may be, but not limited to, a proportional to absolute temperature (PTAT) unit. That is, the temperature sensing unit 110 outputs a voltage or a current that increases in proportion to a rise in temperature or has a positive temperature coefficient. For the purpose of illustration in this embodiment, the temperature signal is a voltage signal. FIG. 2A is a diagram illustrating the relationship between the voltage and temperature of the temperature sensing unit 110. As shown in FIG. 2A, the temperature sensing unit 110 senses a temperature T and outputs a temperature sensing signal with voltage VTEP.

Figure 2B:
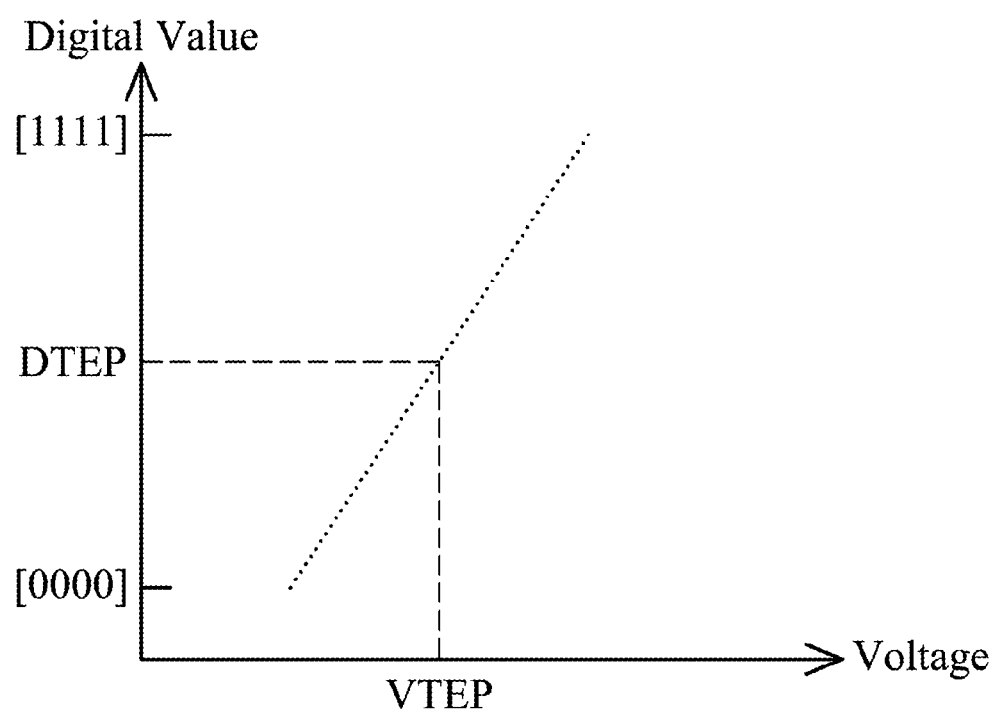
FIG. 2B is a diagram illustrating the relationship between the digital value and the voltage.

The ADC 120 of the present invention is coupled to the temperature sensing unit 110 and is used to convert the temperature sensing signal VTEP to a digital value. FIG. 2B is a diagram illustrating the relationship between the digital value and the voltage. As can be seen from FIGS. 2A and 2B, the digital value DTEP outputted by the ADC 120 should correspond to the temperature sensing signal VTEP and further to the temperature value T. In general, the ADC usually has an innate ADC output range. For example, a 4-bit ADC has an ADC output range from a value of "0000" to a value of "1111", as shown in FIG. 2B.

Figure 3A:
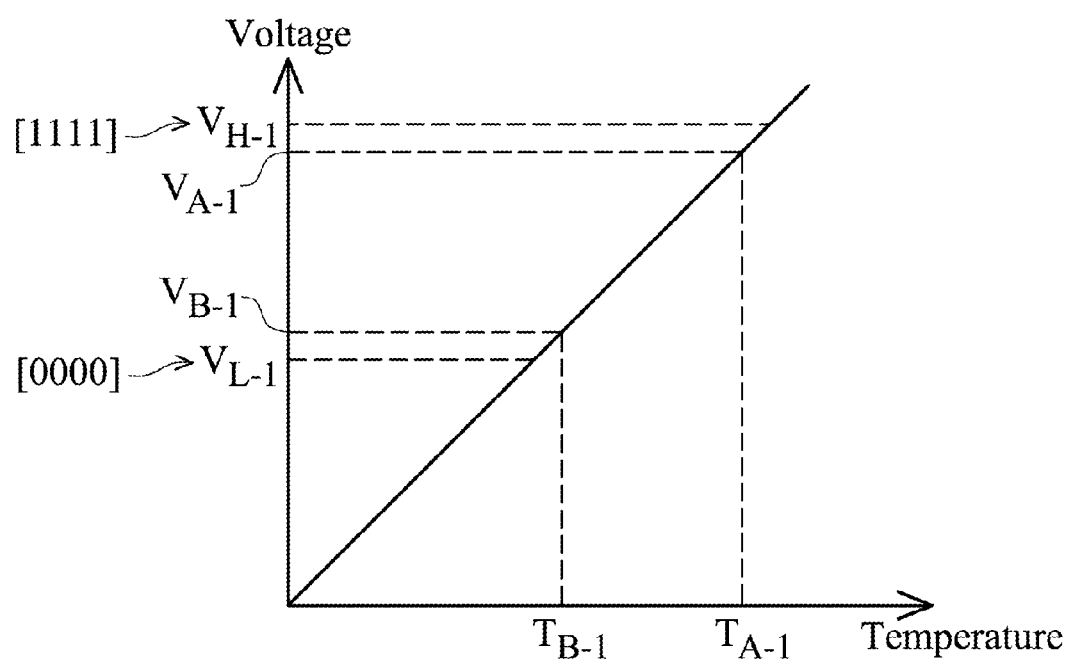
FIG. 3A is a diagram illustrating an example where the temperature sensor 100 is used in a first temperature range.
Figure 3B:
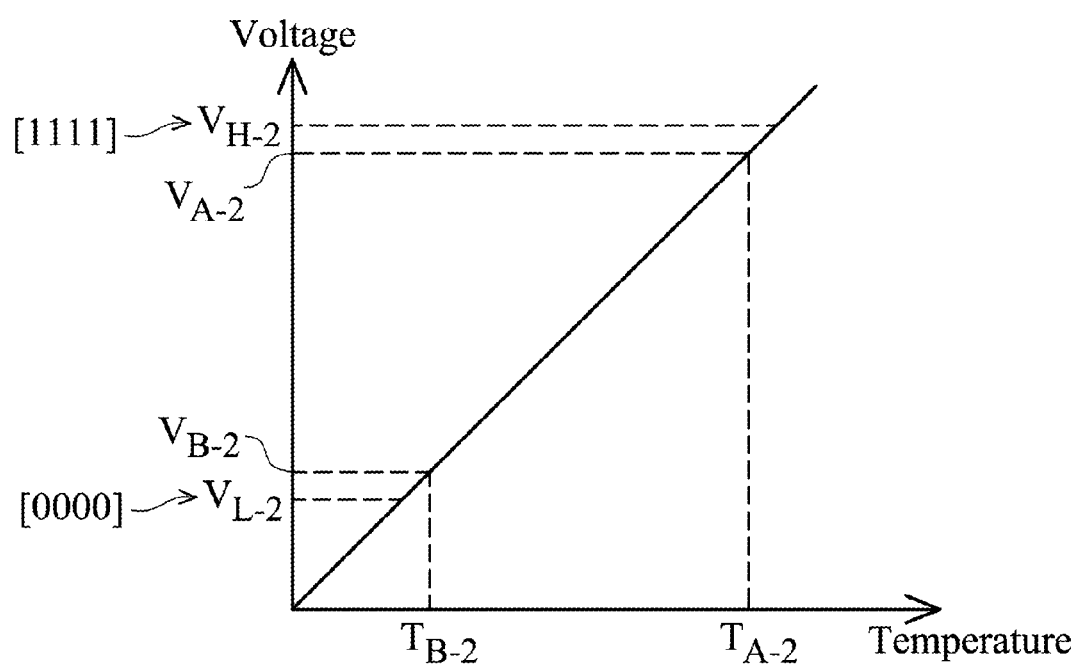
FIG. 3B is a diagram illustrating an example where the temperature sensor 100 is used in a second temperature range.

The purpose of the present invention is to measure temperature in one or more than one temperature ranges with variable sensitivity. In order to achieve this purpose, the present invention provides a specific calibration unit 130 to alter the precision of the ADC 120. The calibration unit 130 of the present invention is coupled to the ADC 120 and is used to correlating the ADC output range with one or more than one ADC input range, and further with one or more than one temperature range. FIG. 3A is a diagram illustrating an example where the temperature sensor 100 is used in a first temperature range from TB_1 to TA_1; and FIG. 3B is a diagram illustrating an example where the temperature sensor 100 is used in a second temperature range from TB_2 to TA_2. Due to the same temperature sensing unit 110, FIGS. 3A and 3B have the same voltage-temperature relationship. The first temperature range from TB_1 to TA_1 corresponds to (maps to) a first sensing output range from VB_1 to VA_1, while the second temperature range from TB_2 to TA_2 corresponds to (maps to) a second sensing output range from VB_2 to VA_2, wherein the first and second sensing output ranges are the actual output ranges of the temperature sensing unit 110 in the first and second temperature ranges, respectively. As can be seen from FIGS. 3A and 3B, the first temperature range is narrower than the second temperature range, and the first sensing output range is narrower than the second sensing output range. When the temperature sensor 100 in a narrow temperature range (e.g., the first temperature range) is used, the calibration unit 130 can correlate the fixed ADC output range (e.g., ranged from the value of [0000] to the value [1111]) with a narrow ADC input range to increase the precision of the ADC. Specifically, referring to FIGS. 3A and 3B, when using the present invention in the first temperature range, the calibration unit 130 correlates the ADC output range from [0000] to [1111] with an ADC input range from voltage VL_1 to voltage VH_1 (thus, correlating the ADC output range with the first temperature range from TB_1 to TA_1), and, when using the present invention in the second temperature range, the calibration unit 130 correlates the ADC output range from [0000] to [1111] with an ADC input range from voltage VL_2 to voltage VH_2 (thus, correlating the ADC output range with the second temperature range from TB_2 to TA_2).

In a preferred embodiment, the ADC input range (e.g., VL_1 to VH_1) corresponding to the ADC output range (e.g., [0000] to [1111]) is adjusted so that it is slightly wider than the sensing output range (e.g., VB_1 to VA_1) corresponding to the temperature range (e.g., TB_1 to TA_1), as shown in FIG. 3A. However, in another embodiment, the ADC input range corresponding to the ADC output range may be adjusted to be equal to the sensing output range corresponding to the temperature range (not shown in Figs.).

The memory unit 140 of the present invention is coupled to the calibration unit 130 and is used for recording the correlation between the ADC output range and the at least one temperature range. Specifically, in the embodiment of the first temperature range, the calibration unit 130 correlates the ADC output range (e.g., [0000] to [1111]) with the first temperature range (TB_1 to TA_1), and the memory unit 140 further records the correlated result from the calibration unit 130, i.e., the correlation between the ADC output range and the first temperature range. Similarly, in the embodiment of the second temperature range, the calibration unit 130 correlates the ADC output range (e.g., [0000] to [1111]) with the second temperature range (TB_2 to TA_2), and the memory unit 140 further records the correlated result from the calibration unit 130, i.e., the correlation between the ADC output range and the second temperature range. Note that although the two temperature ranges are disclosed as shown in FIGS. 3A and 3B, it should be appreciated by one skilled in the art that the disclosed temperature sensor 100 can be implemented for any number of temperature ranges. The amount of the temperature ranges of the present invention depends on the capacity of the memory unit 140. Further, the recoding processes may be implemented, for example, during the manufacturing stage before the memory unit 140 is marked or a setting stage before the memory unit 140 is actually utilized. The memory unit 140 may be a flash memory, a once-timing-programmable (OTP), an eFuse, a Laser Fuse, an EPROM or an EEPROM.

Figure 4:
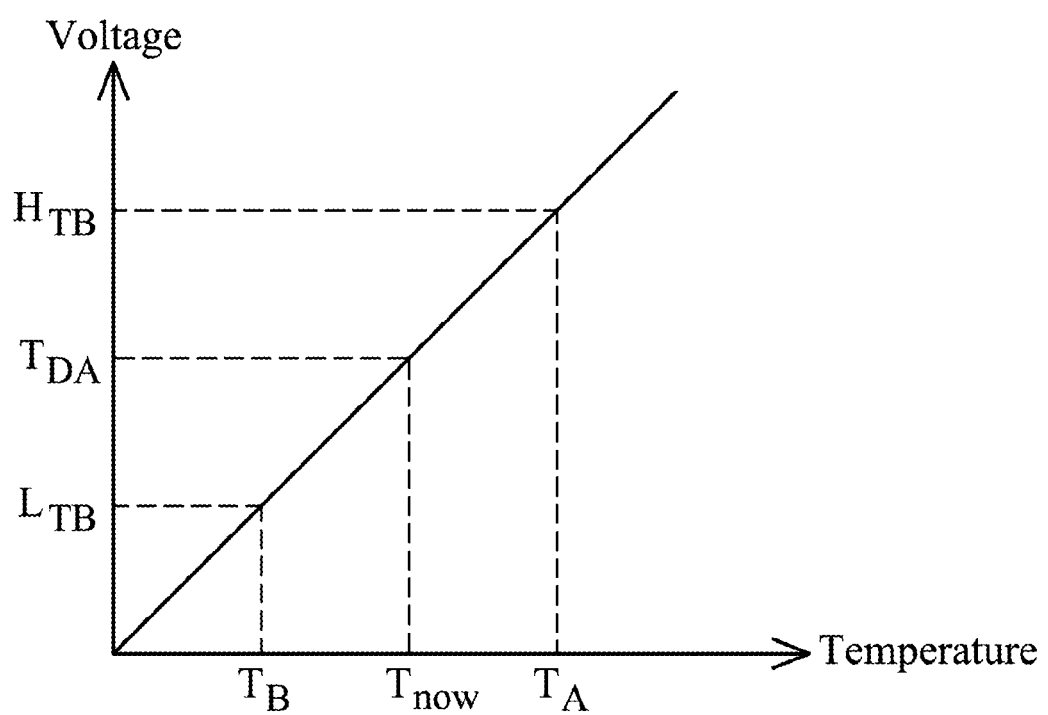
FIG. 4 illustrates the calculation of the result temperature.

The temperature sensor 100 of the present invention can be further used to calculate the measured temperature. In an embodiment, when the temperature sensor 100 is used to measure temperature in a first temperature range, the calibration unit 130 calculates a first result temperature according to the digital signal value from the ADC 120, and the ADC output range and the first temperature range recorded in the memory unit 140. In another embodiment, when the temperature sensor 100 is used to measure temperature in a second temperature range, the calibration unit 130 calculates a second result temperature according to the digital signal value from the ADC 120, and the ADC output range and the second temperature range recorded in the memory unit 140. FIG. 4 illustrates the calculation of the result temperature. The calibration unit 130 calculates the result temperature Tnow, for example, by using linear interpolation, according to the digital signal value TDA obtained from the ADC, and the ADC output range (from "[1111]" to "[0000]") and the temperature range (from "TA" to "TB") recorded in the memory unit 140. The equation of the interpolation function is as follows: Tnow=(TA−TB)*(TDA−[0000])/([1111]−[0000])+TB.

Figure 5:
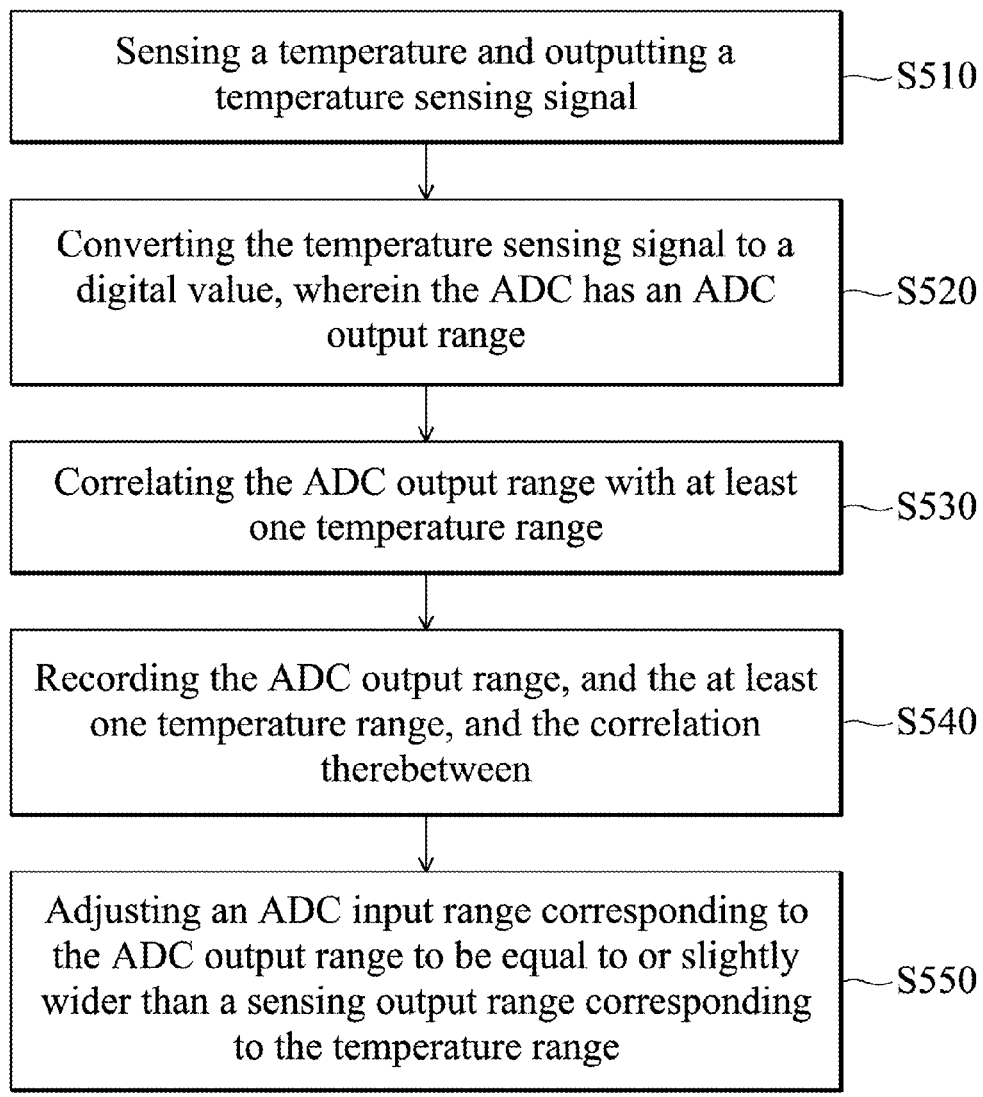
FIG. 5 is a flowchart of the temperature sensing method according to an embodiment of the present invention.

In addition to the temperature sensor 100 mentioned above, the present invention further provides a temperature sensing method. FIG. 5 is a flowchart of the temperature sensing method according to an embodiment of the present invention. The subsequent steps for the sensing method are now described with respect to the temperature sensor 100 in FIG. 1. The temperature sensing method comprises: in step S510, sensing a temperature and outputting a temperature sensing signal, for example, by the temperature sensing unit 110; in step S520, converting the temperature sensing signal to a digital value, for example, by the ADC 120, wherein the ADC has an ADC output range; in step S530, correlating the ADC output range with at least one temperature range, for example, by the calibration unit 130; and in step S540, recording the ADC output range, and the at least one temperature range, and the correlation therebetween, for example, by the memory unit 140. In a preferred embodiment, the temperature sensing method further comprises: in step S550, adjusting an ADC input range corresponding to the ADC output range to be equal to or slightly wider than a sensing output range corresponding to the temperature range.

In an embodiment, the temperature sensing method further calculates (not shown) a first result temperature according to the digital signal value from the ADC 120, and the ADC output range and a first temperature range from the memory unit 140, when the temperature method is used to measure the first temperature range. In another embodiment, the temperature sensing method calculates (not shown) a second result temperature according to the digital signal value from the ADC 120, and the ADC output range and a second temperature range from the memory unit 140, when the temperature method is used to measure the second temperature range. In these embodiments, the temperature sensing method may calculate the first and second result temperature using linear interpolation.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A temperature sensor, comprising:
 a temperature sensing unit for sensing a temperature and outputting a temperature sensing signal;
 an analog-to-digital converter (ADC), coupled to the temperature sensing unit, for converting the temperature sensing signal to a digital value, having an ADC output range;
 a calibration unit, coupled to the ADC, for correlating the ADC output range with at least one temperature range;
 a memory unit, coupled to the calibration unit, recording the ADC output range, and the at least one temperature range, and the correlation therebetween,
 wherein an ADC input range corresponding to the ADC output range is adjusted so that it is equal to or slightly wider than a sensing output range corresponding to the temperature range.

2. The temperature sensor as claimed in claim 1, wherein, when the temperature sensor is used to measure temperature in a first temperature range, the calibration unit calculates a first result temperature according to the digital signal value from the ADC, and the ADC output range and the first temperature range from the memory unit.

3. The temperature sensor as claimed in claim 2, wherein, when the temperature sensor is used to measure temperature in a second temperature range, the calibration unit calculates a second result temperature according to the digital signal value from the ADC, and the ADC output range and the second temperature range from the memory unit.

4. The temperature sensor as claimed in claim 3, wherein the calibration unit calculates the first and second result temperature using linear interpolation.

5. The temperature sensor as claimed in claim 1, wherein the temperature sensing unit is a proportional to absolute temperature (PTAT) unit.

6. The temperature sensor as claimed in claim 1, wherein the temperature sensor is integrated with an electronic component in a semiconductor chip for measuring the temperatures of the electronic component.

7. The temperature sensor as claimed in claim 6, wherein the electronic component is a center processing unit (CPU).

8. The temperature sensor as claimed in claim 1, wherein the memory unit is a flash memory, a once timing programmable (OTP), an eFuse, a Laser Fuse, an EPROM or an EEPROM.

9. A temperature sensing method, comprising:
 sensing a temperature and outputting a temperature sensing signal;
 converting the temperature sensing signal to a digital value by an analog-to-digital converter (ADC), wherein the ADC has an ADC output range;
 correlating the ADC output range with at least one temperature range; and
 recording the ADC output range, and the at least one temperature range, and the correlation therebetween by a memory unit,
 adjusting an ADC input range corresponding to the ADC output range to be equal to or slightly wider than a sensing output range corresponding to the temperature range.

10. The temperature sensing method as claimed in claim 9 further comprises:
 calculating a first result temperature according to the digital signal value from the ADC, and the ADC output range and a first temperature range from the memory unit, when the temperature method is used to measure the first temperature range.

11. The temperature sensing method as claimed in claim 10 further comprising:
 calculating a second result temperature according to the digital signal value from the ADC, and the ADC output range and a second temperature range from the memory unit, when the temperature method is used to measure the second temperature range.

12. The temperature sensing method as claimed in claim 11 further comprising:
 calculating the first and second result temperature using linear interpolation.

* * * * *